(12) United States Patent
Attallah et al.

(10) Patent No.: US 8,301,331 B2
(45) Date of Patent: Oct. 30, 2012

(54) METHOD AND DEVICE FOR THE CALIBRATION OR DIAGNOSIS OF A MOTOR VEHICLE BRAKE SYSTEM HAVING A CYCLICALLY OPERATED PUMP

(75) Inventors: Faouzi Attallah, Darmstadt (DE); Tobias Scheller, Hofbieber (DE); Tom Robert, Kassel (DE)

(73) Assignee: Continental Teves AG & Co. oHG (DE)

( * ) Notice: Subject to any disclaimer, the term of this patent is extended or adjusted under 35 U.S.C. 154(b) by 110 days.

(21) Appl. No.: 12/739,456

(22) PCT Filed: Oct. 22, 2008

(86) PCT No.: PCT/EP2008/064284
§ 371 (c)(1),
(2), (4) Date: Oct. 21, 2010

(87) PCT Pub. No.: WO2009/053389
PCT Pub. Date: Apr. 30, 2009

(65) Prior Publication Data
US 2011/0184606 A1   Jul. 28, 2011

(30) Foreign Application Priority Data

Oct. 24, 2007   (DE) .......................... 10 2007 050 662

(51) Int. Cl.
*G01M 17/00* (2006.01)
(52) U.S. Cl. .......... 701/29.1; 702/185; 702/71; 340/648; 303/10; 303/155; 303/122.12; 701/71
(58) Field of Classification Search ............... 701/29.1, 701/29.2, 29.3, 29.4, 29.5, 29.6, 29.7, 29.8, 701/29.9, 30, 31, 32, 33, 34, FOR. 100, FOR. 101, 701/FOR. 102, FOR. 103, FOR. 104, FOR. 105, 701/FOR. 106, 31.4, 71; 702/63, 64, 185; 340/648; 303/10, 11, 113.5, 115, 116.4, 303/119.2, 155; 184/7.2; 417/32, 42, 44.1, 417/53, 286; 62/126, 127; 318/599; 60/445

See application file for complete search history.

(56) References Cited

U.S. PATENT DOCUMENTS 4,302,812 A * 11/1981 Fitch ............................. 702/64

(Continued)

FOREIGN PATENT DOCUMENTS

DE     196 51 154 A1     6/1997

(Continued)

*Primary Examiner* — Behrang Badii
*Assistant Examiner* — Yuri Kan
(74) *Attorney, Agent, or Firm* — RatnerPrestia

(57) ABSTRACT

A method for the calibration or diagnosis of a motor vehicle brake system having a cyclically operated pump. At least one parameter ($U_{RP}^{Off}$), representing the electromotor force of the reference pump, is repeatedly ascertained during operation of a reference pump under defined guidelines. A statistical characteristic variable ($\langle U_{RP}^{Off} \rangle$) is derived from the values of parameter ($U_{RP}^{Off}$) ascertained for the reference pump. Parameter ($U_{BP}^{Off}$) is ascertained under a corresponding guideline during operation of an operating pump. Corresponding statistical characteristic variable ($\langle U_{BP}^{Off} \rangle$) is derived from the values of parameter ($U_{BP}^{Off}$) ascertained for the operating pump. At least one ratio number is calculated as a measure of the deviation of the operating behavior of the operating pump from the operating behavior of the reference pump from the characteristic variable ($\langle U_{RP}^{Off} \rangle$) calculated for the reference pump and the characteristic variable ($\langle U_{BP}^{Off} \rangle$) calculated for the operating pump.

14 Claims, 5 Drawing Sheets

U.S. PATENT DOCUMENTS

| | | | | |
|---|---|---|---|---|
| 4,745,562 A | * | 5/1988 | Prazdny | 702/71 |
| 4,787,479 A | * | 11/1988 | Ostermeyer et al. | 184/7.2 |
| 5,221,125 A | * | 6/1993 | Okochi et al. | 303/10 |
| 5,823,640 A | * | 10/1998 | Eichhorn et al. | 303/119.2 |
| 5,971,502 A | * | 10/1999 | Albert et al. | 303/122.12 |
| 6,092,992 A | * | 7/2000 | Imblum et al. | 417/42 |
| 6,102,492 A | * | 8/2000 | Diehle et al. | 303/113.5 |
| 6,123,395 A | * | 9/2000 | Wolf et al. | 303/11 |
| 6,188,947 B1 | * | 2/2001 | Zhan | 701/71 |
| 6,315,369 B1 | * | 11/2001 | Hirose | 303/10 |
| 6,341,947 B1 | * | 1/2002 | Otomo | 417/286 |
| 6,446,490 B1 | * | 9/2002 | Lohner et al. | 73/39 |
| 6,499,813 B1 | * | 12/2002 | Wandel | 303/115.4 |
| 6,529,135 B1 | * | 3/2003 | Bowers et al. | 340/648 |
| 6,604,909 B2 | * | 8/2003 | Schoenmeyr | 417/32 |
| 6,668,634 B1 | * | 12/2003 | Zimmermann et al. | 73/129 |
| 6,719,377 B1 | * | 4/2004 | Zimmermann et al. | 303/115.4 |
| 6,741,056 B1 | * | 5/2004 | Hall | 318/599 |
| 7,140,699 B2 | * | 11/2006 | Gronau et al. | 303/113.4 |
| 7,346,475 B2 | * | 3/2008 | Dimino et al. | 702/185 |
| 7,878,006 B2 | * | 2/2011 | Pham | 62/127 |
| 7,905,098 B2 | * | 3/2011 | Pham | 62/126 |
| 8,133,034 B2 | * | 3/2012 | Mehlhorn et al. | 417/53 |
| 8,160,827 B2 | * | 4/2012 | Jayanth et al. | 702/63 |
| 8,177,519 B2 | * | 5/2012 | Branecky | 417/44.11 |
| 8,177,520 B2 | * | 5/2012 | Mehlhorn et al. | 417/53 |
| 2003/0080611 A1 | * | 5/2003 | Wandel | 303/10 |
| 2004/0105759 A1 | * | 6/2004 | Gram et al. | 417/53 |
| 2005/0069418 A1 | * | 3/2005 | Kokubo | 417/44.1 |
| 2005/0156465 A1 | * | 7/2005 | Gronau et al. | 303/114.3 |
| 2006/0202552 A1 | | 9/2006 | Magel et al. | |
| 2007/0210648 A1 | * | 9/2007 | Sato et al. | 303/155 |
| 2008/0191549 A1 | * | 8/2008 | Giering et al. | 303/116.4 |
| 2008/0231108 A1 | | 9/2008 | Attallah et al. | |
| 2010/0037604 A1 | * | 2/2010 | Rampen et al. | 60/445 |
| 2011/0184606 A1 | * | 7/2011 | Attallah et al. | 701/29 |

FOREIGN PATENT DOCUMENTS

| | | |
|---|---|---|
| DE | 199 61 293 A1 | 6/2000 |
| DE | 100 49 506 A1 | 4/2001 |
| DE | 10 2005 041 556 A1 | 3/2007 |
| WO | WO 2005/007475 A1 | 1/2005 |

* cited by examiner

METHOD AND DEVICE FOR THE CALIBRATION OR DIAGNOSIS OF A MOTOR VEHICLE BRAKE SYSTEM HAVING A CYCLICALLY OPERATED PUMP

CROSS REFERENCE TO RELATED APPLICATIONS

This application is the U.S. national phase application of PCT International Application No. PCT/EP2008/064284, filed Oct. 22, 2008, which claims priority to German Patent Application No. 10 2007 050 662.9, filed Oct. 24, 2007, the contents of such applications being incorporated by reference herein.

FIELD OF THE INVENTION

The invention relates to a method and to a device for the calibration or diagnosis of a motor vehicle brake system having a pump operated in a pulsed fashion.

BACKGROUND OF THE INVENTION

Such a motor vehicle brake system is usually provided with two two-way valves that prevent locking of the wheels of a motor vehicle by their alternate switching. The two-way valves are usually driven by means of a control unit designed as a so-called microcontroller. Details on the functioning of a motor vehicle brake system may be gathered, for example, from the specialist book by Dubbel, Taschenbuch für den Maschinenbau [Manual of engineering], Springer Verlag, Heidelberg, 20th Ed. 2001, ISBN 3-540-67777-1, section Q/vehicle engineering, which is incorporated by reference. It is normal to provide a pump for pumping brake fluid in such a motor vehicle brake system. Optimized driving of the two two-way valves, and thus an optimized braking operation, can be achieved by driving the two two-way valves as a function of the brake line pressure between a master brake cylinder and a wheel brake cylinder of a wheel brake. This brake line pressure is denoted below as admission pressure.

DE 10 2005 041 556 A1, which is incorporated by reference, discloses a method for determining an admission pressure prevailing between a master brake cylinder and an inlet valve of a wheel brake cylinder of a motor vehicle brake system. According to the method, in this case the admission pressure is determined by taking account of the profile of a run-on voltage of a motor, operated in a pulsed fashion, of the pump. To this end, a plurality of characteristic variables of the voltage profile are measured and used in each case to determine an admission pressure value, there taking place an evaluation of the quality and/or reliability of the measured characteristic variables, a filtering and/or conditioning of the characteristic variables and/or of the admission pressure values determined therefrom in the event of lack of quality and/or reliability of the measured characteristic variables, averaging of the admission pressure values coming from the different characteristic variables, account being taken only of pressure values of similar magnitude, and the admission pressure values being averaged over time in order to damp fluctuations.

In order to determine the admission pressure during operation of the pump, a correspondingly determined characteristic curve is stored in a data memory of a control unit controlling the motor vehicle brake system. The two two-way valves are driven according to the admission pressure calculated with the aid of the characteristic curve.

However, carrying out the method is rendered difficult by the fact that the characteristic curve turns out to be different for each individual pump and each individual brake system as a consequence of manufacturing tolerances. As the duration of operation of the pump increases, there is, in addition, an occurrence of aging and wear phenomena, for example at the rotary bearing of the pump impeller, and these influence the operating characteristics of the brake system.

SUMMARY OF THE INVENTION

It is therefore an object of the invention to specify a method for the purpose of calibrating or diagnosing a motor vehicle brake system having a pump operated in a pulsed fashion that is easy to carry out and at the same time precise.

The first step to this end is to determine for a reference pump at least one parameter that represents the electromotive force of the reference pump motor, this being done repeatedly (that is to say multiply in sequence) under defined stipulations. A statistical characteristic variable is derived from the values of the parameter that are determined for the reference pump. As reference pump, use is made here, in particular, of a pump used to carry out reference measurements in the development phase of the brake system in the context of a prototype of the vehicle brake system. The parameter considered is determined, in particular, from the motor voltage falling at the reference pump. The defined stipulations are a set of test conditions that relate, for example, to the installation of the pump in a special type of a motor vehicle brake system, the temperature or the chemical composition of the brake fluid. A further stipulation is that the parameter be determined in a load free state of the brake system, that is to say without actuation of the brake pedal.

In a further method step, the same parameter is determined under stipulations for an operating pump that correspond—in particular, under the same stipulations as far as possible. Denoted as operating pump is the pump that is to be calibrated, which is a component of a motor vehicle brake system intended to be installed in a motor vehicle or already installed in the motor vehicle. The operating pump and the associated brake system are in this case in particular of the same type as the reference pump and, especially, the brake system associated therewith. A corresponding statistical characteristic variable is also derived from the values that are determined for the reference pump.

In accordance with the method, there is calculated from the characteristic variables derived for the reference pump and for the operating pump, respectively, at least one ratio that is used as a measure of a possible deviation of the operating behavior of the operating pump in relation to the operating behavior of the reference pump.

The ratio is generally a function of the characteristic variables that are determined for reference pump and operating pump. In formal terms:

$$VZ = g(K_{RP}, K_{BP}),$$

VZ denoting the ratio,
g denoting a function,
$K_{RP}$ denoting the characteristic variable derived for the reference pump, and
$K_{BP}$ denoting the characteristic variable derived for the reference pump.

In the simplest case, the ratio is calculated as quotient of the characteristic variables.

In an advantageous design of the method, the ratio is used to calibrate the operating pump by adapting a characteristic curve of the operating pump to a correspondingly prescribed characteristic curve of the reference pump as a function of this ratio. In other words, the characteristic curve of the operating pump stems from the characteristic curve of the reference pump in that this characteristic curve of the reference pump is calculated with the ratio or by means of a function dependent on the ratio. Expressed in formal terms $$f_{BP}(P) = h(f_{RP}(P), VZ)$$

$f_{BP}(P)$ denoting the characteristic curve of the operating pump, $f_{RP}(P)$ denoting the characteristic curve of the reference pump, P denoting a parameter that represents the electromotive force of the respective pump motor, as a function of which the above characteristic curves are formulated, and h denoting a prescribed calibration function.

The characteristic curve of the operating pump is consequently a function of the characteristic curve of the reference pump and of the ratio. In this way, once it has been determined for the reference pump, the characteristic curve can be used in a form adapted to the conditions of the operating pump. The characteristic curve for the reference pump can in this case include any desired functional relationship between the parameter and a variable describing the behavior of the brake system. In this way, findings obtained for the reference pump during the development phase of the motor vehicle brake system can also be used to the full extent for the operating pump.

The characteristic curve of the reference pump is available at any time for calculation with the at least one ratio. In this case, it is stored in particular in a data memory of the control unit designed as microcontroller. Consequently, the calibration of the operating pump can be carried out anew at any time. In an advantageous application of the method, it is, in particular, provided to carry out a first calibration before the motor vehicle is delivered. It is possible thereby to eliminate manufacturing tolerances in the production of the operating pump and the entire motor vehicle brake system, without the need to determine the characteristic curve for each operating pump individually from the beginning. It is preferred to carry out further calibrations at periodical intervals, for example in the course of maintenance of the motor vehicle in a workshop. Aging and wear processes of the operating pump and of the entire motor vehicle brake system can also be eliminated in this way.

In an advantageous variant of the method, the characteristic curves represent a functional relationship between the at least one parameter and a brake line pressure of the motor vehicle brake. The brake line pressure can be determined in this way without the use of a pressure transducer adapted to the operating state of the operating pump. The adaptation of the characteristic curve measured for the reference pump to the operating pump yields an increase in the accuracy during the determination of the brake line pressure. The brake line pressure calculated by means of the characteristic curve is, in particular, the pressure of the brake line connected on the discharge side to the pump, that is to say the so-called admission pressure. Given the exact, knowledge of this admission pressure, it is possible for the switching instant of the two two-way valves to be prescribed exactly by means of the control unit. A particularly controlled braking operation can be achieved in this way. Pressure surges such as can arise in the event of unfavorable switching instants of the two two-way valves, and which impair the controllability of the motor vehicle during the braking operation, are therefore reliably avoided.

Alternatively, or in addition, as functional value the characteristic curve can also supply a throughflow rate and/or an operating temperature of the respective pump as a function of the at least one parameter.

In a further advantageous variant of the method, the ratio is used to effect a diagnosis of the operating pump by checking whether the ratio lies inside or outside a prescribed tolerance range. If the ratio or the characteristic variable lies outside the tolerance range, this means that the operating pump deviates strongly from the reference pump in terms of its operating behavior. The operating pump is identified as defective in this case.

The above-described checking takes place in the course of a normal calibration operation, for example. During the calibration of the motor vehicle brake system, immediately prior to the commissioning of a motor vehicle, it is thereby possible for faults in the operating pump, for example manufacturing faults or installation faults, to be reliably detected. Again, any strong occurrences of aging or wear of the operating pump can be detected after a relatively long operation of the motor vehicle, such that the operating pump can be repaired or exchanged in good time. The checking can also be undertaken to this end independently of the pump calibration.

The statistical evaluation of the parameters determined for the reference pump and/or for the operating pump is preferably performed by plotting the acquired parameter values in respective histograms for the reference pump and for the operating pump, the statistical characteristic variables used for the calculation of the ratio being determined from the respective histogram. A histogram is understood below as a frequency distribution of measured values of the parameter that occur over a prescribed number of operating clocks. The voltage present across the motor terminals after termination of a drive pulse of the pump voltage is preferably used as parameter representative of the electromotive force of the pump motor. This voltage is represented in particular by the first acquired voltage value (denoted as $U^{Off}$ below) inside an interpulse period following the pulse. Additionally or alternatively, the voltage present on average over time during the interpulse period is used as parameter in a further expedient design of the method. This voltage is, in particular, represented in metrological terms by the average value (denoted below as $U^{AVER}$) of a plurality of voltage values acquired during the interpulse period. It has emerged that these two parameters are to a high degree specific to each individual pump, and enable a particularly precise conclusion regarding the operating behavior of this pump.

Furthermore, the following parameters of the pump voltage are ascertained optionally—in addition or as an alternative to the above variables—and taken into account when determining the statistical characteristic variables, in particular when creating the histograms, if appropriate:

last voltage value of a pulse of an operating clock of the respective pump, first voltage value of the pulse, differential value between the last voltage value of the pulse and the first voltage value of the interpulse period, lowest voltage value within the interpulse period, sum or time integral of the voltage values within the interpulse period, slope of the voltage fall within the interpulse period, difference between the lowest voltage value of the interpulse period and the first voltage value of the following pulse, time up to the fall of the voltage to zero.

Each of these values can easily be acquired by carrying out a measurement of the motor voltage of the pump motor and by correlating this measurement with the known operating clock of the pump. If appropriate, a simple algebraic operation such as summation or averaging, or the calculation of a compensating straight line, is further carried out. It is thereby possible for a voltage measuring arrangement to be integrated in a simple way in circuit logic of a control unit designed as microcontroller.

The clocking of the respective pump is preferably firmly prescribed within the scope of the stipulations. Consequently, the ratio of the duration of a pulse to the duration of a following interpulse period is always the same for the reference pump and for the operating pump. The measured values for the reference pump and for the operating pump therefore come under the same stipulations for the driving of the pump motor. It may also expressly be pointed out that the intention here is also to include stipulations in the case of which the clocking is changed several times one after another in a defined way during a measurement. It is possible with the aid of such a stipulation for the characteristic curve of the operating pump to be acquired in a further context as if only a single clocking were to be used for measurement.

In an expedient development, the at least one parameter is normalized to a further one of the above named parameters. In formal terms $$\|P(t_i)\| = \frac{P(t_i)}{P'(t_i)},$$

$P(t_i)$ denoting a first parameter of the motor voltage of the respective pump,
$P'(t_i)$ denoting a second parameter of the motor voltage of the respective pump,
$\|P(t_i)\|$ denoting the first parameter normalized to the second parameter, and
$t_i$ denoting the instant of the measurement, i=1, ... n, (n being the number of the measurements on which a histogram $H_{RP}$, $H_{BP}$ is based).

As a result of the normalization of the parameter, it is possible, in particular, to compensate fluctuations in the absolute value of the motor voltage that would otherwise influence values measured in the interpulse period.

In an expedient design of the method, use is made, as statistical characteristic variable in each case, of the mean value of the parameter values that are acquired for the reference pump and for the operating pump, respectively.

The characteristic variable, that is to say, in particular, the mean value, can be obtained by direct statistical evaluation of the parameter values. In an alternative design of the method, which exhibits a particularly good numerical stability of the method, particularly for a low number of parameter values, the first step is for a mathematical distribution function to be adapted to each histogram by means of a numerical regression method (Fit). The statistical characteristic variables are obtained in this case from the adapted distribution function. A Gaussian distribution function, in particular, is used as distribution function.

In an expedient development, the ratios of a plurality of parameters are calculated with respect to one another in order to form a total ratio. In the case of a measured variable that depends on all the parameters on which the ratios are based, it is thereby possible to determine a more accurate calibration and thus a characteristic curve for the operating pump that is better adapted to reality. This may be written in formal terms as $$VZ^{\{\Sigma\}} = \tilde{g}(VZ_1, \ldots, VZ_N),$$

$VZ^{\{\Sigma\}}$ denoting the total ratio,
$\tilde{g}$ denoting a function, and
$VZ_1, \ldots, VZ_N$ denoting the N ratios used for the calculation.

This total ratio is advantageously a weighted sum of the ratios. In the simplest case, this is the arithmetic mean value of all the ratios. However, it is also possible to take account of the influence of individual parameters on the characteristic curve by means of weighting factors. In general, the total ratio is therefore yielded as a linear combination of the individual ratios, the formal expression being $$VZ^{\{\Sigma\}} = \sum_{j=1}^{N} \alpha_j \cdot VZ_j,$$

$VZ^{\{\Sigma\}}$ denoting the total ratio,
the $VZ_j$ denoting the individual ratios, and
the $\alpha_j$ denoting the weighting coefficients thereof.

The above object is achieved, furthermore, by a device for the calibration of a motor vehicle brake system having a pump operated in a pulsed fashion, and having a control unit designed to carry out the above-described method. This control unit is designed, in particular, as a microcontroller, and is therefore small and compact. Here, the individual refinements of the method are to be transferred to the device mutatis mutandis together with its advantages.

BRIEF DESCRIPTION OF THE DRAWINGS

The invention is best understood from the following detailed description when read in connection with the accompanying drawings. Included in the drawings is the following figures.

BRIEF DESCRIPTION OF THE PREFERRED EMBODIMENTS

Figure 1:
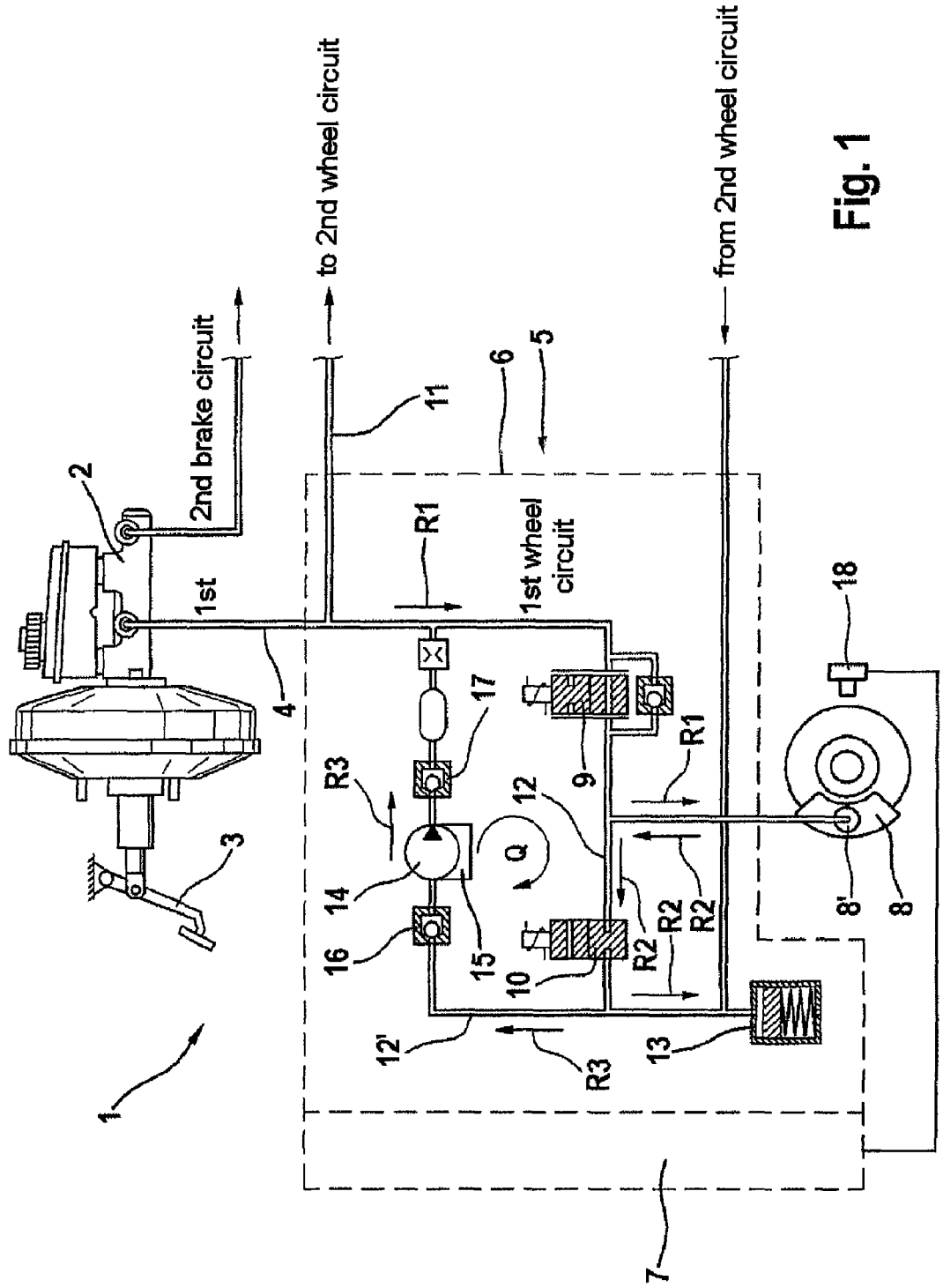
FIG. 1 shows a schematic of a motor vehicle brake system.

FIG. 1 shows a slip-controlled motor vehicle brake system 1 of a motor vehicle. Each wheel of the motor vehicle is assigned a wheel brake circuit. Two wheel brake circuits each are combined to form a brake circuit. Since the design of the overall total of four wheel brake circuits is equivalent, only one wheel brake circuit is shown in FIG. 1 for the purpose of greater clarity.

The motor vehicle brake system 1 has a master brake cylinder 2 that can be actuated by means of a brake pedal 3 and applies to both brake circuits simultaneously the braking force of the brake pedal 3 boosted by a brake booster. The master brake cylinder 2 is connected to a wheel brake cylinder 8' of a wheel brake 8 of a wheel by means of a brake line 4 and a control device 5 that comprises a hydraulic device 6 and a control unit 7. The hydraulic unit 6 comprises two two-way valves 9, 10, a return line 12, a low-pressure accumulator 13, a second return line 12' and a pump 14 driven by a motor 15. The pump 14 is designed as a radial piston pump and has an intake valve 16 on the intake side and a discharge valve 17 on the discharge side. The control unit 7, which is designed as a microcontroller, drives the two two-way valves 9, 10 and the pump 14. In addition, the control unit 7 is assigned a tachometer 18, by means of which the instantaneous rotational speed of the wheel can be acquired.

In the normal driving operation of the motor vehicle, the first two-way valve 9 is open in the currentless state and the second two-way valve 10 is closed in the currentless state. Upon activation of the brake pedal 3, the brake fluid is displaced in the direction R1 toward the wheel brake cylinder 8'. The braking force is thereby transmitted directly onto the wheel brake cylinder 8'. The wheel of the motor vehicle is braked. In addition, the rotational speed of all four wheels and of the motor vehicle is constantly comprised by means of the control unit 7. If the rotational speed of a wheel reduces rapidly by comparison with the other wheels, slip is present. The wheel threatens to lock. In this case, the control unit 7 is used to switch over the two two-way valves 9, 10 simultaneously or virtually simultaneously and in a mutually coordinated fashion. The two-way valve 9 is now closed such that the braking force 9 can no longer act on the wheel brake cylinder. Via the return connection 12, brake fluid is discharged in the direction R2 toward the low-pressure accumulator 13 via the now open two-way valve 10. The wheel brake cylinder 8 is relieved of load in this way. The wheel is freed from the wheel brake again such that its rotational speed again equals the speed of the motor vehicle. By means of the pump 14, the brake fluid is conveyed back in the direction of the brake line 4 from its intake side with its intake valve 16 in the direction R3 of its discharge side with its discharge valve 17.

Subsequently, the two two-way valves 9, 10 are switched over again in a mutually coordinated fashion such that, in turn, the initial situation with an open two-way valve 9 and a closed two-way valve 10 is present. The braking force exerted on the brake pedal 3 now acts again on the wheel brake cylinder 10. The vehicle is further braked until, in turn, there occurs a significant braking of the wheel associated with a slip, and the two two-way valves 9, 10 are switched over anew. These three operations—braking, if necessary relief, and if necessary return of the brake fluid—take place in this case in very rapid sequence in fractions of a second until the motor vehicle is braked or can again be brought under control. Reliable braking is achieved in this way even under critical conditions, that is to say, for example, when a high braking force is applied on a roadway that is wet with rain or slippery with snow.

Returning brake fluid with the aid of the pump 14 ensures that no sharp fall in line pressure occurs in the brake line 4, which would be attended by a reduction in the braking force that could be exerted on the brake cylinder.

The electric motor 15 of the pump 14 is based in principle on a separately excited DC machine for driving the pump impeller, whose speed is controlled via a pulse width modulation (PWM) of a constant supply voltage. The speed of the pump impeller can be set in a plurality of ranges in this case. The discharge rate of the pump 14 is prescribed, in turn, via the speed of the pump impeller. In order to control the speed, the duration of the pulse, and thus the residual clock duration of the interpulse period, following the pulse, of the supply voltage present at the motor are modulated within a fixed time interval (a PWM cycle or operating clock, for example with a period of 60 ms). A maximum drive level of the motor corresponds to a supply voltage present over the entire time interval of the operating clock. In the case of a lower drive level, the supply voltage of the motor 15 is switched off after a certain time (for example after 40 ms), remains switched off for the residual duration of the operating clock (20 ms in the example) and is switched on again at the start of the next operating clock. With the decreasing drive level or speed range, the duration of the interpulse period increases by comparison with the duration of the pulse for a prescribed duration of the operating clock. Thus, the control unit can be used to control the speed of the pump impeller, and thus the discharge rate of the pump 14 in a wide range coordinated with the respective required discharge.

Figure 2:
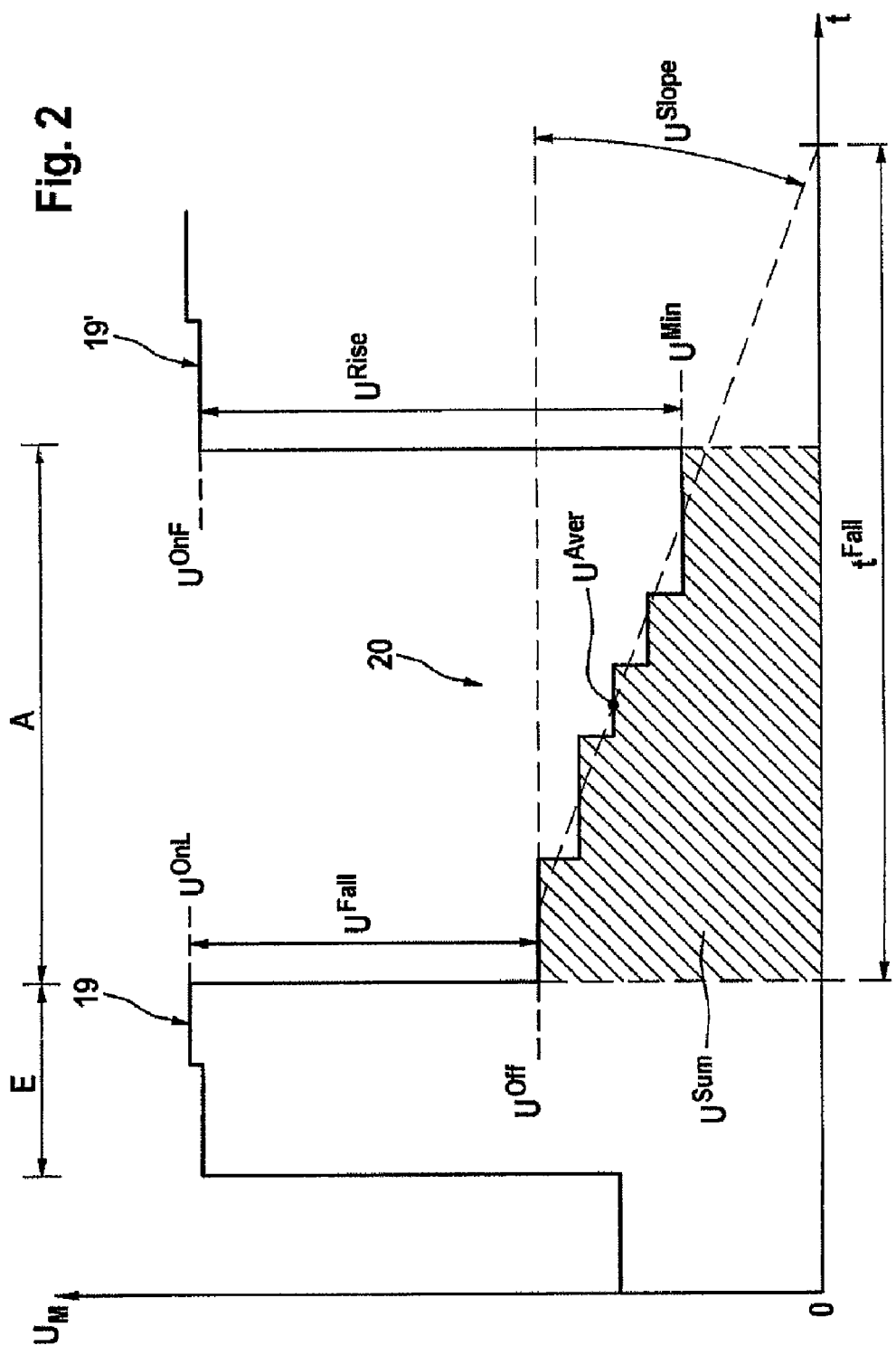
FIG. 2 shows a detail of a motor voltage measured at a motor of a pump, in a time/voltage diagram.

FIG. 2 shows the motor voltage $U_M$ dropping at the motor 15 in a time/voltage diagram. The operating clock of the supply voltage (not illustrated in FIG. 2) is essentially simulated in the motor voltage $U_M$: a pulse 19 of pulse width E is followed by an interpulse period 20 of the residual clock duration A. The pulse 19 and the interpulse period 20 together constitute an operating clock. The interpulse period 20 is followed by a pulse 19' of a following operating clock. During the pulse 19, the motor voltage $U_M$ corresponds essentially to the supply voltage. However, the motor voltage $U_M$ does not drop to zero during the interpulse period 20. The reason for this is that the motor 15 runs on directly after being switched off and induces a voltage. The motor 15 consequently acts somewhat like a generator. During the interpulse period 20, the motor voltage $U_M$ continues to drop. Also plotted in FIG. 2 are a plurality of parameters P that all relate to the profile of the motor voltage $U_M$ during the interpulse period. In detail, these are:

the last voltage value $U^{OnL}$ or pulse 19, the first voltage value $U^{OnF}$ of the pulse 19' following the interpulse period 20, the first voltage value $U^{Off}$ of the interpulse period 20 (subsequently: initial voltage $U^{Off}$), the differential value $U^{Fall}$ between the last voltage value $U^{OnL}$ of the pulse 19 and the first voltage value $U^{Off}$ of the interpulse period 20, the lowest voltage value $U^{Min}$ within the interpulse period 20, where the sum $U^{Sum}$ of the voltage values within the interpulse period 20, where the $$U^{Sum} = \sum_{i=1}^{n} U_i$$

holds and all the voltage values $U_i$ are added to one another during the interpulse period 20, the mean voltage value $U^{Aver}$ of the voltage values within the interpulse period 20 (subsequently: average voltage $U^{Aver}$, where $$U^{Aver} = \frac{1}{n} \cdot U^{Sum} = \frac{1}{n} \cdot \sum_{i=1}^{n} U_i$$

holds, the slope $U^{slope}$ of the voltage fall within the interpulse period 20, the difference $U^{Rise}$ between the lowest voltage value $U^{Min}$ of the interpulse period 20 and the first voltage value $U^{OnF}$ of the subsequent pulse 19', and the time $t^{Fall}$ up to the drop of the voltage to zero (since this drop to zero does not take place owing to the following pulse, this value has been extrapolated in FIG. 2).

The first step is to determine a characteristic curve $p_v=p_v(U_{RP}^{Off})$ for a reference pump; said characteristic curve depends on the initial voltage $U_{RP}^{Off}$ as parameter. The characteristic curve $p_v(U_{RP}^{Off})$ is stored in a data memory of the control unit 7. Consequently, during the later operation of the motor vehicle brake system 1 of an end user in which an operating pump is now obstructed, it is possible to use the measured instantaneous value of the initial voltage $U_{BP}^{Off}$ measured at the operating pump in order to calculate the instantaneous value of the admission pressure $p_v$. The two two-way valves 9, 10 are driven by the control unit 7 as a function of this calculated admission pressure $p_v$. There is thus no need for a complicated measurement of the admission pressure $p_v$ by means of a pressure transducer.

Figure 3:
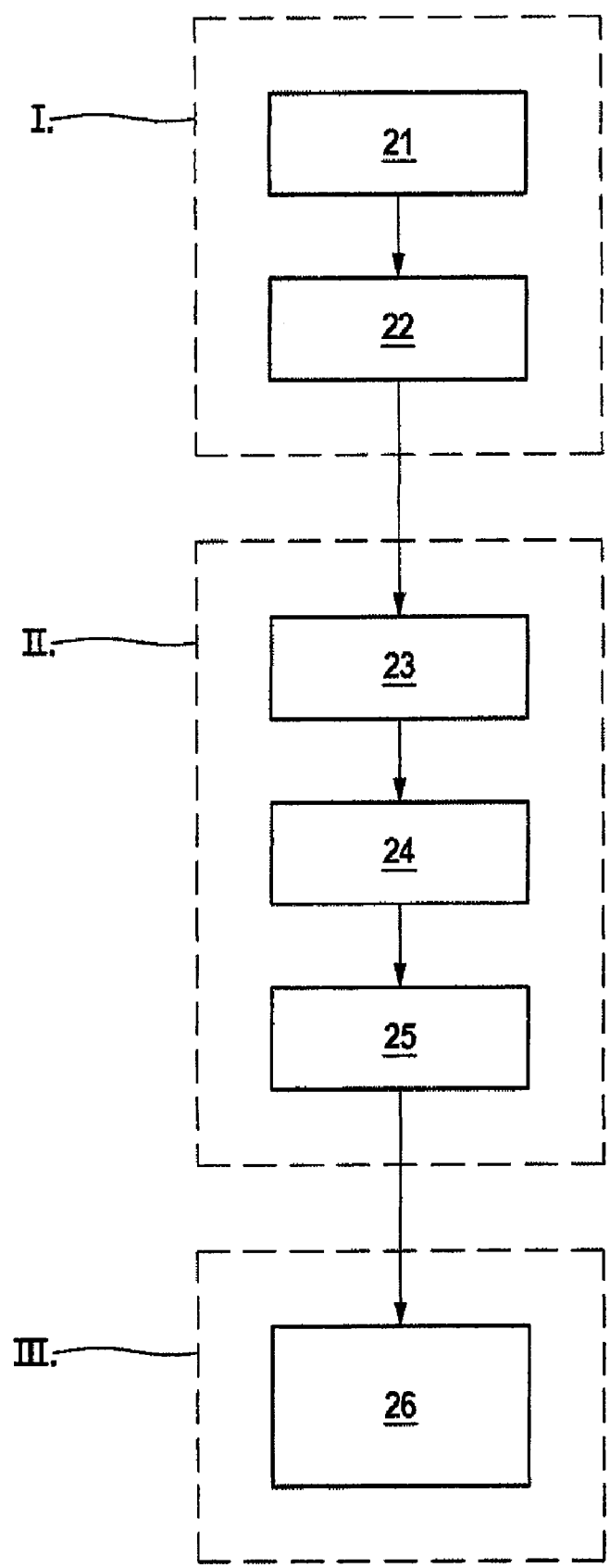
FIG. 3 shows a method block diagram for the calibration of the pump.

As already stated additionally, manufacturing tolerances and aging processes of the operating pump are not also required in this mode of procedure. FIG. 3 shows a method block diagram, in the case of which the operating pump is additionally calibrated in relation to the reference pump.

During a test phase I, the characteristic curve $p_v(U_{RP}^{Off})$ is determined between the initial voltage $U_{RP}^{Off}$ and the admission pressure $p_v$ for the reference pump in a method step 21, in particular on a laboratory set-up of the brake system. In a method step 22, a histogram $H(U_{RP}^{Off})$ for the initial voltage $U_{RP}^{Off}$ is determined for the reference pump, likewise during the test phase I. The characteristic curve $p_v(U_{RP}^{Off})$ and the histogram $H(U_{RP}^{Off})$ are stored in the data memory of the control unit 7.

A special operating pump is calibrated during a calibration phase II. following the test phase I. The operating pump is already installed in this case in a vehicle, particularly in the context of an associated brake system. One histogram $H(U_{BP}^{Off})$ each is determined for the initial voltage $U_{BP}^{Off}$ in the calibration phase II. The stipulations for the calibration correspond if possible substantially to those stipulations under which the histogram $H(U_{RP}^{Off})$ was determined for the reference pump.

In a method step 24, the mean values $H\langle U_{RP}^{Off}\rangle$, $H\langle U_{BP}^{Off}\rangle$ of the parameters $U_{RP}^{Off}$ and $U_{BP}^{Off}$, respectively, are calculated as statistical characteristic variables from the two histograms $H\langle U_{RP}^{Off}\rangle$, $H\langle U_{BP}^{Off}\rangle$ determined for the initial voltage $U^{Off}$. A ratio VZ is calculated from these mean values by forming a quotient $$VZ = \frac{\langle U_{BP}^{Off}\rangle}{\langle U_{RP}^{Off}\rangle}.$$

In a method step 25, a characteristic curve $p_v(U_{BP}^{Off})$ of the operating pump is adapted to the characteristic curve $p_v(U_{RP}^{Off})$ measured for the reference pump in the test phase I. as a function of this ratio VZ. The characteristic curve $p_v(U_{BP}^{Off})$ is stored here in the data memory of the control unit 7 as a function of the characteristic curve $p_v(U_{RP}^{Off})$ of the reference pump and of the ratio VZ:

$$p_v(U_{BP}^{Off})=f(p_v(U_{RP}^{Off}),VZ).$$

In the case both of the reference pump and of the operating pump, the data acquisition for the histograms $H\langle U_{RP}^{Off}\rangle$ and $H\langle U_{BP}^{Off}\rangle$ is always performed in the load-free state of the motor vehicle brake system 1, that is to say with brake pedal 3 unactivated.

During operating phase III. of the motor vehicle brake system 1, when the vehicle is in operation the admission pressure $p_v$ of the brake line 4 is now continuously calculated in a method step 26 from the characteristic curve $p_v(U_{BP}^{Off})$ stored in the control unit 7, this being done with the aid of the measured values of the initial voltage $U_{BP}^{Off}$ measured at the operating pump. The two two-way valves 9, 10 are driven in an adapted fashion with the aid of this determined admission pressure $p_v$.

The calibration phase II. is periodically repeated if required. Moreover, as the calibration is being carried out either automatically by the control unit 7 or manually by a service technician, a check is made as to whether the ratio VZ lies within or outside a prescribed tolerance range. If it is established during this checking that the ratio VZ lies outside the tolerance range, the operating pump is identified as defective. In this case, the control unit 7 outputs a warning signal in the case of automatic checking.

The method steps corresponding to the calibration phase II. and the operating phase III. are carried out by the control unit 7 designed as a microcontroller. However, as an alternative to this, the calibration phase II. can also be carried out by an external control unit, for example by a workshop measurement computer. In this case, upon termination of the calibration the resulting (new) characteristic curve $p_v(U_{BP}^{Off})$ for the operating pump is transmitted to the control unit 7 and stored in the data memory thereof. The transmission of the characteristic curve $p_v(U_{BP}^{Off})$ is performed, for example, via a data cable via which the control unit is connected to the external control unit.

Figure 4:
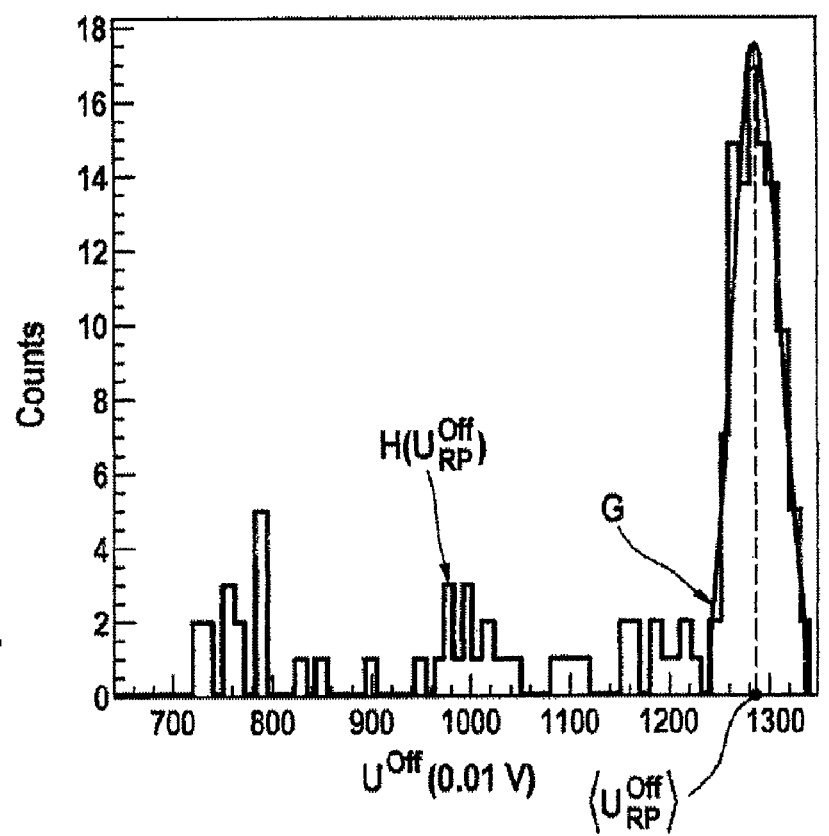
FIG. 4 shows a histogram of the initial voltage of a reference pump.

FIG. 4 shows the histogram $H(U_{RP}^{Off})$ for the initial voltage $U_{RP}^{Off}$ of the reference pump. A prescribed operating clock is applied to the motor 15 of the reference pump over a prescribed test period in order to determine the histogram $H(U_{RP}^{Off})$. Depending on the operating clock, a voltage value $U_{RP}^{Off}(t_i)$ is acquired for the initial voltage $U_{RP}^{Off}$ at an instant $t_i$, $i=1, \ldots, n$. Each measured value $U_{RP}^{Off}(t_i)$ is normalized to the last voltage value $U_{RP}^{OnL}(t_i)$ of the preceding pulse 19, in formal notation:

$$\|U_{RP}^{Off}(t_i)\| = \frac{U_{RP}^{Off}(t_i)}{U_{RP}^{OnL}(t_i)}.$$

This normalization compensates fluctuations in the absolute value of the motor voltage $U_M$ that would otherwise influence the measurement.

Upon termination of the test period, the voltage values $U_{RP}^{Off}(t_i)$ are assigned, in accordance with their value, voltage intervals that cover the entire spectrum of the measured voltage values $U_{RP}^{Off}(t_i)$. The number of voltage values $U_{RP}^{Off}(t_i)$ that lie in each of the voltage intervals is counted for the purpose of determining the histogram $H(U_{RP}^{Off})$. These numerical values yield the histogram $H(U_{RP}^{Off})$ in accordance with FIG. 4 when plotted against the initial voltage $U_{RP}^{Off}$.

A mathematical distribution function G which has the form of a Gaussian distribution function is adapted to the histogram $H(U_{RP}^{Off})$. The adapted distribution function G is used to determine the mean value $\langle U_{RP}^{Off}\rangle$, which in the case of the Gaussian distribution function corresponds to the maximum thereof. This mean value is stored in the data memory of the control unit 7.

Figure 5:
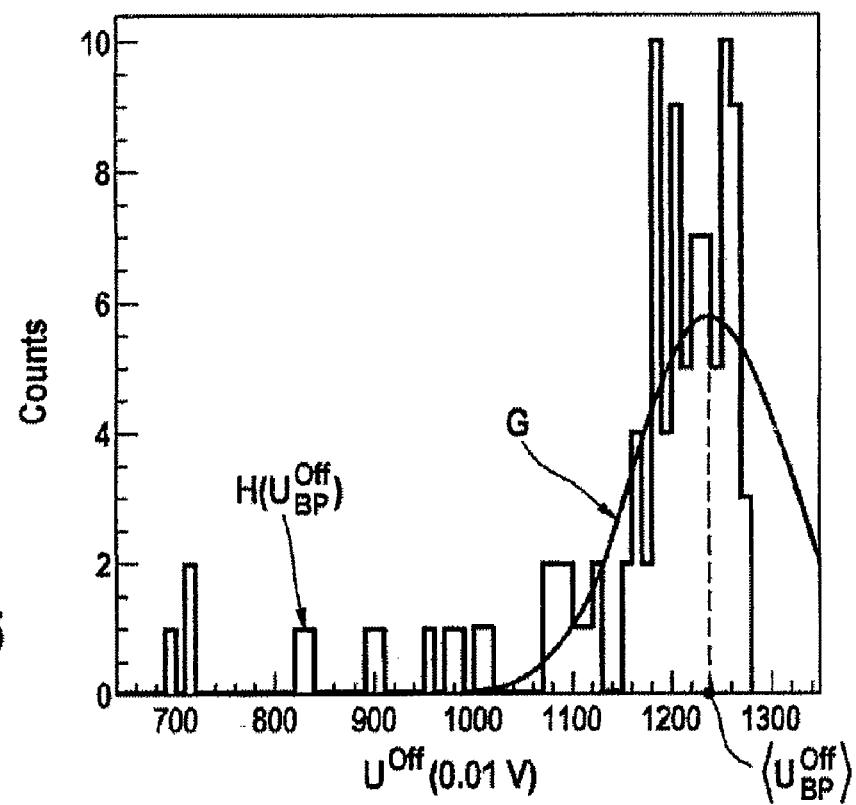
FIG. 5 shows a further histogram of the initial voltage of an operating pump and
FIG. 6 shows for the reference pump and for the operating pump a respective characteristic curve that describes the admission pressure of the respective pump as a function of the respective initial voltage.

FIG. 5 shows the histogram $H(U_{BP}^{Off})$ produced in a corresponding way for the operating pump, together with the Gaussian distribution function G adapted thereto. The control unit 7 in turn determines the mean value $\langle U_{BP}^{Off} \rangle$ from the distribution function G.

Figure 6:
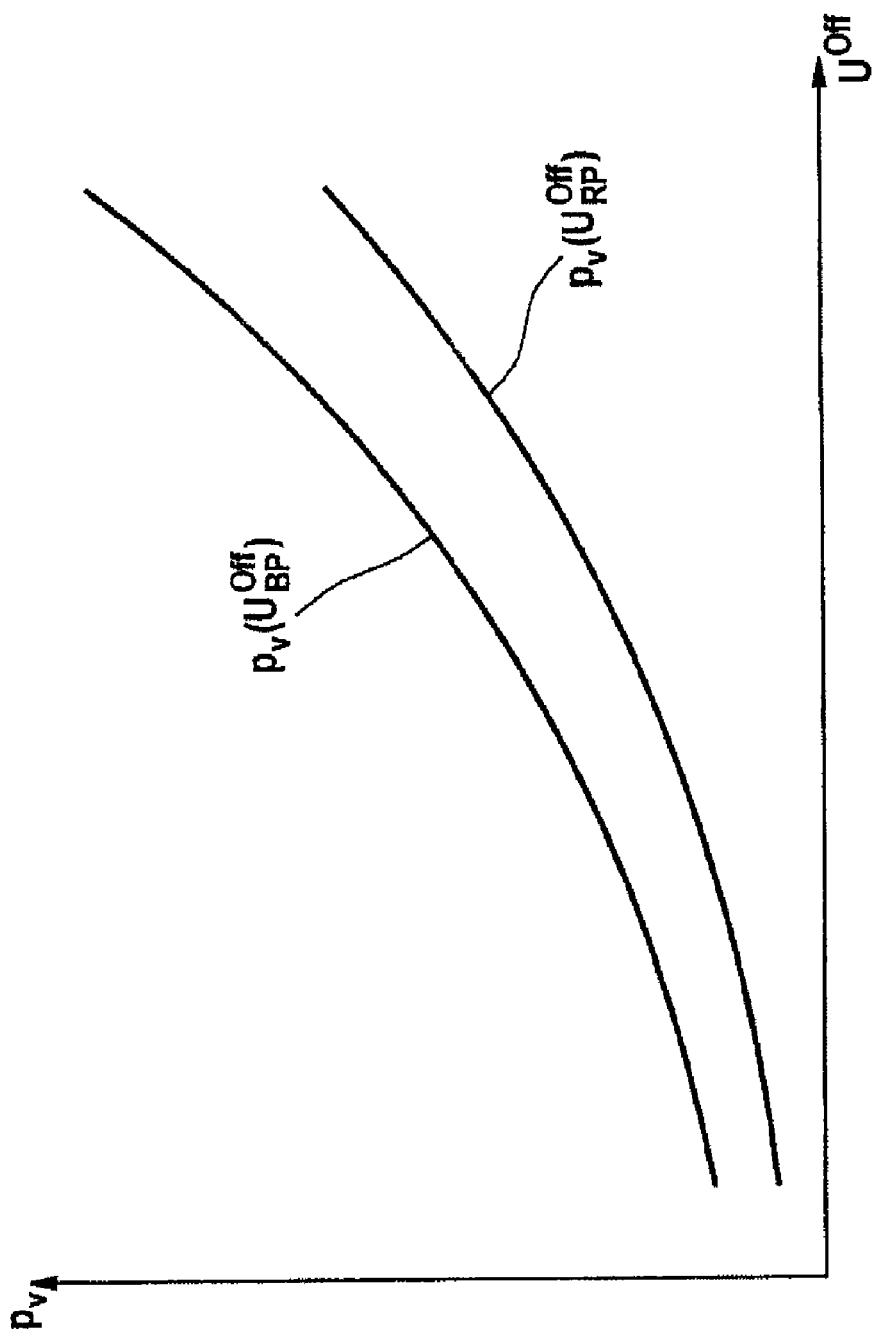

The characteristic curve $p_v = p_v(U_{RP}^{Off})$ is plotted in FIG. 6 as a function of the initial voltage $U^{Off}$, which was determined in accordance with method step 21 in the test phase I. for the reference pump. The characteristic curve $p_v(U_{BP}^{Off})$ for the operating pump stems from the characteristic curve $p_v(U_{RP}^{Off})$ for the reference pump by a simple multiplication by the ratio VZ. In formal terms $$p_v = p_v(U_{BP}^{Off}) = VZ \cdot p_v(U_{RP}^{Off}).$$

The determined characteristic curve $p_v(U_{BP}^{Off})$ is now, as already described, stored in the data memory of the control unit 7.

The invention claimed is:

1. A method for the calibration or diagnosis of a motor vehicle brake system having an operating pump operating in a pulsed fashion during which a pulse period for applying voltage to the operating pump and an interpulse period for not applying voltage to the operating pump are alternated, the method comprising:
   repeatedly determining, by a reference processor, during operation of a reference pump separate from the motor vehicle, under defined stipulations, at least a voltage ($U_{RP}^{off}$) generated by the reference pump during the interpulse period and representing the electromotive force of the reference pump;
   deriving, by the reference processor, a statistical characteristic variable ($\langle U_{RP}^{Off} \rangle$) from the voltage ($U_{RP}^{off}$);
   determining, by an operating processor, during operation of the operating pump in the motor vehicle, a voltage ($U_{BP}^{Off}$) generated by the operating pump during the interpulse period and representing the electromotive force of the operating pump under corresponding stipulations;
   deriving, by the operating processor, a corresponding statistical characteristic variable ($\langle U_{BP}^{Off} \rangle$) from the voltage ($U_{BP}^{Off}$);
   calculating, by the operating processor, at least one ratio as a measure of the deviation of the operating behavior of the operating pump from the operating behavior of the reference pump from the characteristic variable ($\langle U_{RP}^{Off} \rangle$) and the characteristic variable ($\langle U_{BP}^{Off} \rangle$); and
   determining, by the operating processor, if the operating pump in the motor vehicle is defective by comparing the at least one ratio to a tolerance range.

2. The method of claim 1, wherein with the aid of said at least one ratio, a characteristic curve ($p_v(U_{BP}^{Off})$) of the operating pump is adapted to a characteristic curve ($p_v(U_{RP}^{Off})$) correspondingly prescribed for the reference pump.

3. The method as claimed in claim 2, wherein the characteristic curves ($p_v(U_{RP}^{Off})$, $p_v(U_{BP}^{Off})$) represent a functional relationship between the at least one voltage ($U^{Off}$) and a brake line pressure ($p_v$) of the motor vehicle brake system, a pumping rate of the pump and/or the temperature of the pump.

4. The method as claimed in claim 1, wherein if said at least one ratio lies outside a prescribed tolerance range, the operating pump is identified as defective.

5. The method as claimed in claim 1, wherein the statistical characteristic variables ($\langle U_{RP}^{Off} \rangle$, $\langle U_{BP}^{Off} \rangle$) are determined from a histogram ($H(U_{RP}^{Off})$, $H(U_{BP}^{Off})$) of a voltage ($U^{Off}$) created for the reference pump and for the operating pump, respectively.

6. The method as claimed in claim 5, wherein the statistical characteristic variables ($\langle U_{RP}^{Off} \rangle$, $\langle U_{BP}^{Off} \rangle$) are determined from one or more of the following parameters:
   a last voltage value ($U^{OnL}$) of a pulse of an operating clock of the respective pump,
   a first voltage value ($U^{OnF}$) of the pulse,
   a first voltage value ($U^{Off}$) of an interpulse period following the pulse,
   a differential value ($U^{Fall}$) between the last voltage value ($U^{OnL}$) of the pulse and the first voltage value ($U^{Off}$) of the interpulse period,
   a lowest voltage value ($U^{Min}$) within the interpulse period,
   a sum ($U^{Sum}$) of the voltage values within the interpulse period,
   a mean voltage value ($U^{Aver}$) of the voltage values within the interpulse period,
   a slope ($U^{Slope}$) of the voltage fall within the interpulse period,
   a difference ($U^{Rise}$) between the lowest voltage value ($U^{Min}$) of the interpulse period and the first voltage value ($U^{OnF}$) of the following pulse, and
   a time ($t^{Fall}$) up to the fall of the voltage to zero.

7. The method as claimed in claim 1, wherein within the scope of the stipulations, an operating clock of the respective pump is prescribed during the measurement.

8. The method as claimed in claim 1, wherein the at least one voltage ($U^{Off}$) is normalized.

9. The method as claimed in claim 1, wherein use is made, as a statistical characteristic variable, of the mean value ($\langle U_{RP}^{Off} \rangle$, $\langle U_{BP}^{Off} \rangle$) of the values of the voltage ($U^{Off}$) that are acquired for the reference pump and for the operating pump, respectively.

10. The method as claimed in claim 1, wherein a mathematical distribution function (G) is adapted to each histogram ($H(U_{RP}^{Off})$, $H(U_{BP}^{Off})$).

11. The method as claimed in claim 10, wherein the mathematical distribution function (G) is a Gaussian distribution function.

12. The method as claimed in claim 1, wherein a plurality of ratios are calculated in order to form a total ratio.

13. The method as claimed in claim 12, wherein the total ratio is a weighted sum of the ratios.

14. A system for the calibration or diagnosis of a motor vehicle brake system having an operating pump operating in a pulsed fashion during which a pulse period for applying voltage to the operating pump and an interpulse period for not applying voltage to the operating pump are alternated, the device comprising:
   a reference processor configured to:
      repeatedly determine during operation of a reference pump separate from the motor vehicle, under defined stipulations, at least a voltage ($U_{RP}^{Off}$) generated by the reference pump during the interpulse period and representing the electromotive force of the reference pump;

derive a statistical characteristic variable ($\langle U_{RP}^{Off}\rangle$) from the voltage ($U_{RP}^{Off}$);

an operating processor configured to:
  determine during operation of the operating pump in the motor vehicle, a voltage ($U_{BP}^{Off}$) generated by the operating pump during the interpulse period and representing the electromotive force of the operating pump under corresponding stipulations;
  derive a corresponding statistical characteristic variable ($\langle U_{BP}^{Off}\rangle$) from the voltage ($U_{BP}^{Off}$);
  calculate at least one ratio as a measure of the deviation of the operating behavior of the operating pump from the operating behavior of the reference pump from the characteristic variable ($\langle U_{RP}^{Off}\rangle$) and the characteristic variable ($\langle U_{BP}^{Off}\rangle$); and
  determine if the operating pump in the motor vehicle is defective by comparing the at least one ratio to a tolerance range.

* * * * *